(12) United States Patent
Brakes et al.

(10) Patent No.: US 11,208,194 B2
(45) Date of Patent: Dec. 28, 2021

(54) ASSEMBLY FOR WARPING OF AN AERODYNAMIC STRUCTURE

(71) Applicant: Airbus Operations Limited, Bristol (GB)

(72) Inventors: David Brakes, Bristol (GB); Denys Custance, Bristol (GB)

(73) Assignee: Airbus Operations Limited, Bristol (GB)

( * ) Notice: Subject to any disclaimer, the term of this patent is extended or adjusted under 35 U.S.C. 154(b) by 149 days.

(21) Appl. No.: 16/587,804

(22) Filed: Sep. 30, 2019

(65) Prior Publication Data
US 2020/0108911 A1 Apr. 9, 2020

(30) Foreign Application Priority Data

Oct. 4, 2018 (GB) ..................................... 1816183

(51) Int. Cl.
*B64C 3/52* (2006.01)
*B64C 3/18* (2006.01)
*B64C 13/30* (2006.01)

(52) U.S. Cl.
CPC ................ *B64C 3/52* (2013.01); *B64C 3/185* (2013.01); *B64C 13/30* (2013.01)

(58) Field of Classification Search
CPC ........... B64C 3/52; B64C 3/185; B64C 13/28; B64C 13/30
See application file for complete search history.

(56) References Cited

U.S. PATENT DOCUMENTS

| 6,622,974 B1 | 9/2003 | Dockter et al. |
| 7,699,270 B2* | 4/2010 | Lonsinger ............... B64C 3/185 |
| | | 244/219 |
| 2010/0116937 A1* | 5/2010 | Sanderson ............... B64C 3/48 |
| | | 244/123.1 |
| 2013/0064666 A1 | 3/2013 | Thomas et al. |

FOREIGN PATENT DOCUMENTS

| GB | 2563261 A | 12/2018 |
| WO | WO 2013/192483 A1 | 12/2013 |

OTHER PUBLICATIONS

British Search Report for Application No. 1816183.6 dated Apr. 3, 2019.

* cited by examiner

*Primary Examiner* — Philip J Bonzell
*Assistant Examiner* — Ashesh Dangol
(74) *Attorney, Agent, or Firm* — Jenkins, Wilson, Taylor & Hunt, P.A.

(57) ABSTRACT

A spar assembly for an aircraft wing extends between an upper cover and a lower cover and includes linkages spaced consecutively along the length of the spar assembly, each linkage extending from an upper pivot, to a lower pivot, thereby joining upper and lower attachment structures of the spar assembly together. Each linkage includes a pair of fixed-length links pivotably connected at one end about a center pivot and pivotably connected at respective other ends. The spar assembly includes a drive bar connected to the center pivot of each of the linkages, and an actuator arranged to move the drive bar along the length of the spar assembly. When the actuator moves the drive bar along the length of the spar structure, the links in each pair of links are rotated relative to each other about the center pivot, thereby moving the upper and lower covers and warping the wing.

15 Claims, 7 Drawing Sheets

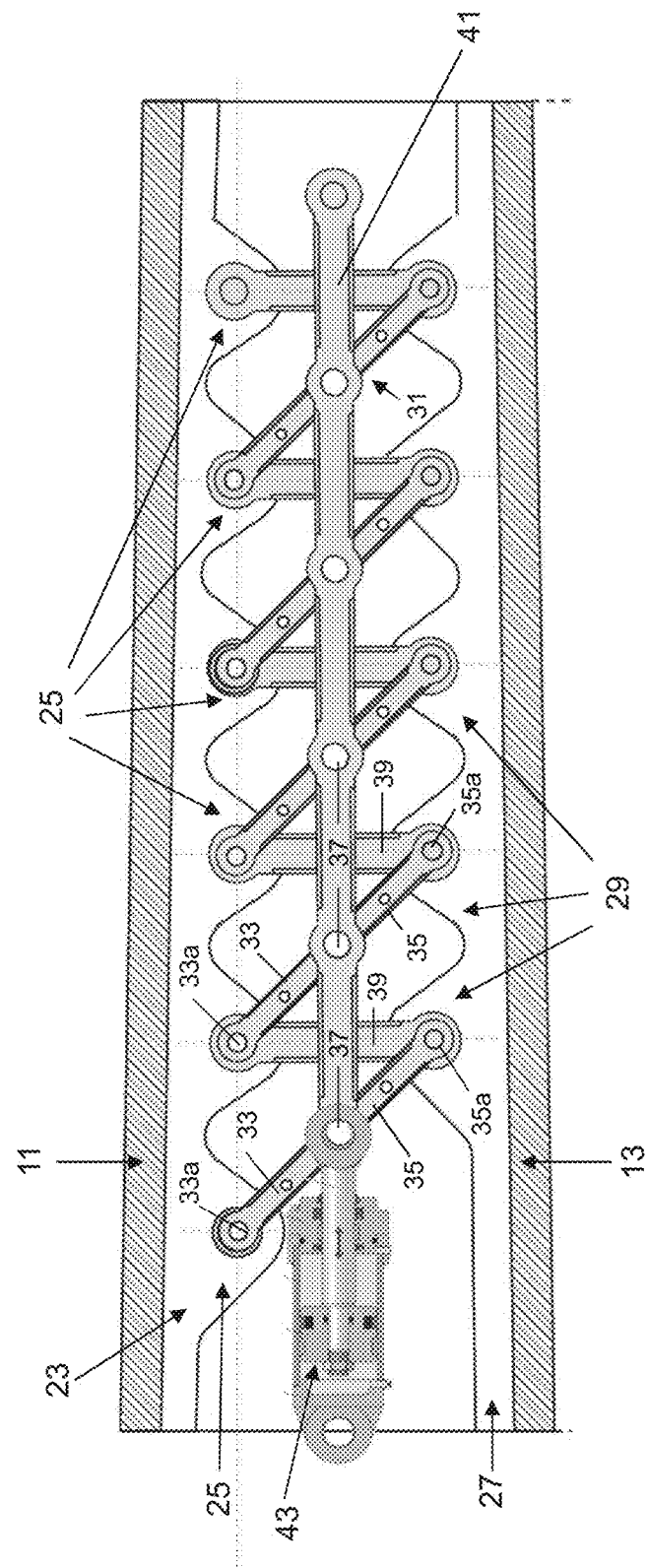

$$F_{DB} = T_L \cos\beta - T_u \cos\theta$$

ASSEMBLY FOR WARPING OF AN AERODYNAMIC STRUCTURE

CROSS-REFERENCE TO RELATED APPLICATION

This application claims priority to GB 1816183.6 filed Oct. 4, 2018, the entire disclosure of which is incorporated by reference herein.

BACKGROUND

The flight of an aircraft is typically controlled using a discrete deployable control surface such as an aileron, elevator, rudder or flap. An alternative approach that has been suggested is to provide a so-called morphing wing in which the wing geometry, often the 2D aerofoil geometry, is locally distorted (for example by actuators inside the wing box manipulating the wing skin or internal structure).

Morphing wings tend to be more aerodynamically efficient than wings which require discrete control devices, but they do suffer from several problems: Firstly, in a morphing wing the ribs tend to be replaced by actuation mechanisms, and/or the ribs are compliant such that an actuator can manipulate the wing geometry when needed. Equally, the wing must be stiff when subjected to flight loads, so the actuation mechanisms tend to be heavy and/or cumbersome to accommodate this requirement. Secondly, morphing mechanisms tend to be required at regular spanwise intervals along the wing in order to perform the structural function of ribs. This may represent a significant cost and weight penalty. Finally, changing the camber of a 2D aerofoil section requires the wing covers to be able to bend and be distorted. This will generate stresses in the covers that may impact on their overall size. Covers can be segmented to address this, but they typically then also need complex sealing arrangements between the different segments.

US20130064666 (Thomas et al) discloses a system for actively controlling the spanwise twist of a hollow beam structure. The system may be applied to hollow spar beam in an aircraft wing such that the wing can be warped. In this context, the term 'warp' will be understood to refer to the overall change in shape of a wing as a result of local changes in the twist. The arrangement in US20130064666 comprises an actuator arranged to move the upper and lower surfaces of the beam structure relative to each other in the longitudinal direction. In one embodiment the actuator comprises a series of solid blocks with high thermal expansion coefficients, which can be selectively heated to cause expansion in the longitudinal direction.

Embodiments of the disclosure herein seek to provide an improved arrangement for warping a wing. Alternatively or additionally, embodiments of the disclosure herein seek to mitigate at least one of the above-mentioned problems.

SUMMARY

According to a first aspect of the disclosure herein, there is provided an aircraft wing comprising: an upper cover; a lower cover; and a spar assembly extending between the upper cover and the lower cover. The spar assembly comprises: an upper attachment structure connected to the upper cover, a lower attachment structure connected to the lower cover; and a multiplicity of linkages spaced along the length of the spar assembly. Each linkage extends from an upper pivot on the upper attachment structure, to a lower pivot on the lower attachment structure, thereby joining the upper and lower attachment structures together. Each linkage is adjustable so as to alter the distance between the upper and lower pivots, thereby enabling the wing to be warped.

Providing a spar assembly in which there are a multiplicity of adjustable, pivoted, linkages between the upper and lower attachment structures has been found to be especially beneficial. In particular, by adjusting the linkages such that the distance between the pivots (on the upper and lower attachment structures) is altered, the position of the upper attachment structure, relative to the position of the lower attachment structure, may be altered, thereby warping the wing. Furthermore, the use of a linkage between the upper and lower attachment structures may enable a mechanical advantage to be obtained when the linkage is actuated.

It may be that the wing is configurable between a first, for example an unwarped, configuration in which the linkages are in a first configuration, and a second, for example a warped, configuration in which the linkages are adjusted to a second configuration to alter the distance between the upper and lower pivots, thereby warping the wing. References herein to unwarped and warped configurations may be considered as relative terms—i.e. in the unwarped configuration the wing may exhibit some twist, but it is preferably less warped than in the warped configuration.

The spar assembly may have a length extending in a longitudinal direction. The spar assembly may have a height extending through the depth of the wing. The spar assembly may have a width extending in a direction orthogonal to the height and length. References herein to directions, are made within this local reference frame of the spar assembly unless otherwise specified.

The distance between the pivots being altered is preferably the distance measured in a longitudinal direction along the length of the spar assembly (i.e. the longitudinal spacing). In other words, the linkages are adjusted such that the upper attachment structure undergoes what can be thought of as a shearing motion, relative to the lower attachment structure.

In principle, the linkages may be adjusted in a number of different ways to alter the distance between the upper and lower pivots. For example, each linkage may be extendable/retractable such that the length of each linkage may be adjustable. The linkage may comprise an actuator, for example a linear actuator. The linkage may comprise a single fixed-length link extending from the upper pivot to the lower pivot.

In preferred embodiments of the disclosure herein, each linkage comprises a plurality of links. Each linkage may comprise: a first link connected, at one end, to the upper pivot; and a second link connected, at one end, to the lower pivot. The first and second links may be pivotably connected together (for example at their other ends) at a third pivot. Each linkage may be adjustable, by adjusting the position of the third pivot, so as to alter the distance between the upper and lower pivots. The first and second links may each be of a fixed length. However, as they are pivoted at each end, the movement of the third pivot will nonetheless act to alter the distance between the first and second pivots on the attachment structures, by moving one of the attachment structures, relative to the other in the longitudinal direction.

The linkage may be adjustable, by adjusting the position of the third pivot within a range of positions. The range of positions may include the position in which the first, second and third pivots are substantially in line. The range of positions may include a relatively small maximum displacement of the third pivot. For example, the maximum displacement of the third pivot may be less than 50 mm, and more preferably less than 20 mm. The included angle between the first and second links may be no less than 150 degrees. The included angle between the first and second links may be no less than 160 degrees.

The first and second links may be configured to carry a tensile load. The first and second links may be configured to carry a compressive load. In arrangements in which the first and second links are in line, there will tend to be substantially no net force on the third pivot, and the flight loads are all reacted within the wing structure. Furthermore, even where the included angle between the first and second pivots is not equal to 180 degrees (i.e. where they are not exactly in line), the net force acting on the third pivot still tends to be relatively low. This is because the component of the flight loads that is not able to be reacted along the length of the links, remains a relatively low proportion of the overall flight loads.

The spar assembly may comprise a drive bar connected to the third pivot of each of the multiplicity of linkages. The wing may comprise an actuator arranged to move the drive bar, such that the actuator can simultaneously adjust the position of the multiplicity of third pivots, via movement of the drive bar.

The drive bar may extend in the longitudinal direction along the length of the spar assembly. The third pivots are all preferably at the same height in the spar assembly. The drive bar may be a straight drive bar, extending in the longitudinal direction along the length of the spar assembly.

Such an arrangement has been found to be especially beneficial. Not only does it enable multiple linkages to be actuated by a single actuator (thereby providing a relatively simple arrangement), it also tends to ensure the actuator is relatively isolated from the flight loads. This is because the majority, and preferably the vast majority, of the flight loads are reacted into the wing structure along the first and second links; the net component of the flight loads reacted in the direction of the drive bar remains relatively small. The actuator may therefore be subjected to relatively low loads during flight. This, in turn, may enable a relatively small and/or lightweight actuator to be used.

Each link may form an acute angle with the drive bar on one side of the link, and an obtuse angle with the drive bar on the opposite side of the link. The magnitude of the respective acute and obtuse angles between the first link and the drive link, and between the second link and the drive link, is preferably similar (the magnitudes would be identical when the pivot points are in line). The magnitude of the respective acute and obtuse angles is preferably sufficiently similar that the flight loads transferred along the drive bar can be held by the actuator.

The first and second pivots are preferably offset from one another in the longitudinal direction along the length of the spar assembly. The linkage, and in some embodiments the first and second links, may therefore preferably extend diagonally between the upper and lower attachment structures. The linkage may extend at an angle of between 35 and 55 degrees from the attachment structures. The linkage may extend at an angle of substantially 45 degrees from the attachment structures.

Each pair of first and second links may be associated with a third link. The third link may extend from the lower pivot to a fourth pivot. The fourth pivot may be on the upper attachment structure. The third link may be of fixed length. Providing the third link may be beneficial because it may stabilize the spar assembly, while still enabling the assembly to be adjusted to warp the wing. The third link may be configured to be subjected to the opposing load to that of the first and second links. For example, the third link may be subjected to a tensile load when the first and second links are subjected to a compressive load. The third link may be subjected to a compressive load when the first and second links are subjected to a tensile load.

The multiplicity of linkages may be spaced apart along the length of the spar assembly. The multiplicity of linkages may be evenly spaced apart. In embodiments in which each linkage comprises the first and second links, and that linkage further comprises the third link, it may be that the fourth pivot is coincident with the upper pivot of the adjacent linkage. Thus, the linkages may be arranged consecutively in series along the length of the spar assembly.

The spar assembly may be a first spar assembly located along a relatively forward or rearward part of the upper and lower covers. The wing may comprise a second spar assembly, located along the other of the relatively forward or rearward part of the covers. The second spar assembly may comprise any or all of the features described herein with reference to the first spar assembly.

The spar assembly may be located in the vicinity of the tip of the wing. For example, the spar assembly may extend within at least the outer 10%, or 20%, or 30%, of the span of the wing. Providing the spar assembly in the vicinity of the tip of the wing may be beneficial because warping this region of the wing tends to provide finer and/or more responsive control.

According to another aspect there is provided a spar assembly for use as the spar assembly herein. The spar assembly may comprise an upper attachment structure connected to the upper cover, a lower attachment structure connected to the lower cover; and a multiplicity of linkages spaced along the length of the spar assembly, each linkage extending from an upper pivot on the upper attachment structure, to a lower pivot on the lower attachment structure, thereby joining the upper and lower attachment structures together. Each linkage may be adjustable so as to alter the distance between the upper and lower pivots, thereby enabling the wing to be warped.

According to another aspect there is provided an aircraft comprising the aircraft wing herein. The aircraft may comprise a wing comprising: an upper cover; a lower cover; and a spar assembly extending between the upper cover and the lower cover. The spar assembly may comprise: an upper attachment structure connected to the upper cover, a lower attachment structure connected to the lower cover; and a multiplicity of linkages spaced along the length of the spar assembly, each linkage extending from an upper pivot on the upper attachment structure, to a lower pivot on the lower attachment structure, thereby joining the upper and lower attachment structures together. Each linkage may be adjustable so as to alter the distance between the upper and lower pivots, thereby enabling the wing to be warped.

According to another aspect there is provided a method of warping a wing on an aircraft, the method comprising the steps of: actuating a multiplicity of linkages in a spar assembly from a first configuration to a second configuration, each linkage extending from an upper pivot on an upper attachment structure of the spar assembly, to a lower pivot on a lower attachment structure of the spar assembly, thereby joining the upper and lower attachment structures together, whereby in the first configuration, the first and second pivots are at a first spacing from each other, and in the second configuration the first and second pivots are at a second, different, spacing from each other, thereby warping the wing.

According to yet another aspect of the disclosure herein, there is provided a spar assembly for extending between an upper cover and a lower cover on an aircraft wing, wherein the spar assembly comprises: an upper attachment structure for connecting to the upper cover, a lower attachment structure for connecting to the lower cover; and a multiplicity of linkages spaced consecutively along the length of the spar assembly, each linkage extending from an upper pivot on the upper attachment structure, to a lower pivot on the lower attachment structure, thereby joining the upper and lower attachment structures together. Each linkage may comprise: a pair of fixed-length links, substantially in-line with one another, and pivotably connected together at one end about a center pivot and pivotably connected to the upper and lower attachment structures at their respective other ends, and wherein the spar assembly further comprises a drive bar connected to the center pivot of each of the multiplicity of linkages, and an actuator arranged to move the drive bar along the length of the spar assembly, such that when the actuator moves the drive bar along the length of the spar structure, the links in each pair of links are rotated relative to each other about the center pivot, away from thereby altering the longitudinal offset between the upper and lower attachment structures.

It has been recognized that aspects of the disclosure herein may also be applicable to other aerodynamic structures on the aircraft. Thus, according to a further aspect of the disclosure herein, there is provided an aerodynamic structure comprising: a first cover; a second cover; and a shear-resisting assembly extending between the first cover and the second cover, wherein the shear-resisting assembly comprises: a first attachment structure connected to the first cover, a second attachment structure connected to the second cover; and a multiplicity of linkages spaced along the length of the shear-resisting assembly, each linkage extending from a first pivot on the first attachment structure, to a second pivot on the second attachment structure, thereby joining the first and second attachment structures together, wherein each linkage is adjustable so as to alter the distance between the first and second pivots, thereby enabling the aerodynamic structure to be warped. The aerodynamic structure may be part of the empennage. The aerodynamic structure may be, or function as, a rudder. The aerodynamic structure may be, or function as, an elevator. It will be appreciated that any features described with reference to other aspects of the disclosure herein may also be applicable to this aspect. For example, the linkage may comprise a pair of links; the pair of links may comprise a first link connected, at one end, to the first pivot; and a second link connected, at one end, to the second pivot. The first and second links may be pivotably connected together at a third pivot; wherein each linkage is adjustable, by adjusting the position of the third pivot, so as to alter the distance between the first and second pivots.

The aircraft is preferably a passenger aircraft. The passenger aircraft preferably comprises a passenger cabin comprising a plurality of rows and columns of seat units for accommodating a multiplicity of passengers. The aircraft may have a capacity of at least 20, more preferably at least 50 passengers, and more preferably more than 50 passengers. The aircraft is preferably a powered aircraft. The aircraft preferably comprises an engine for propelling the aircraft. The aircraft may comprise wing-mounted, and preferably underwing, engines.

It will of course be appreciated that features described in relation to one aspect of the disclosure herein may be incorporated into other aspects of the disclosure herein. For example, the method of the disclosure herein may incorporate any of the features described with reference to the apparatus of the disclosure herein and vice versa.

BRIEF DESCRIPTION OF THE DRAWINGS

Embodiments of the disclosure herein will now be described by way of example only with reference to the accompanying schematic drawings of which:

FIG. 4a shows a frontal view of part of the front spar-assembly in the aircraft of FIG. 1, when the assembly is in the unwarped configuration;

DETAILED DESCRIPTION

Figure 1:
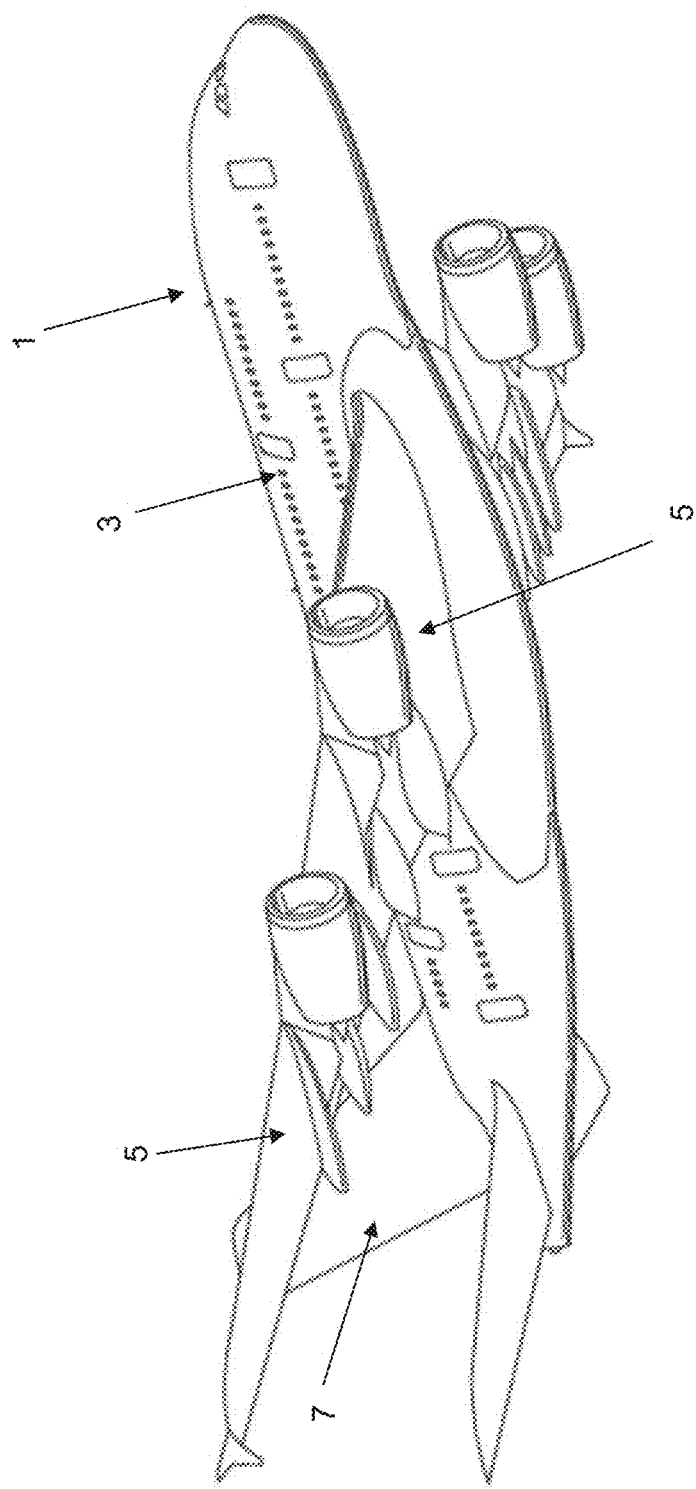
FIG. 1 shows an aircraft having a wing with a spar assembly according to a first embodiment of the disclosure herein.

FIG. 1 shows an aircraft 1 having a fuselage 3, wings 5 and empennage 7. In the embodiment shown, the outer part of each wing 5 is lacking ailerons. Instead, each wing 5 comprises a spar assembly according to a first embodiment of the disclosure herein. The spar assembly is configured to warp the wing between an unwarped and a warped configuration, thereby enabling control of the aircraft flight. This wing warping will now be described in detail.

Figure 2:
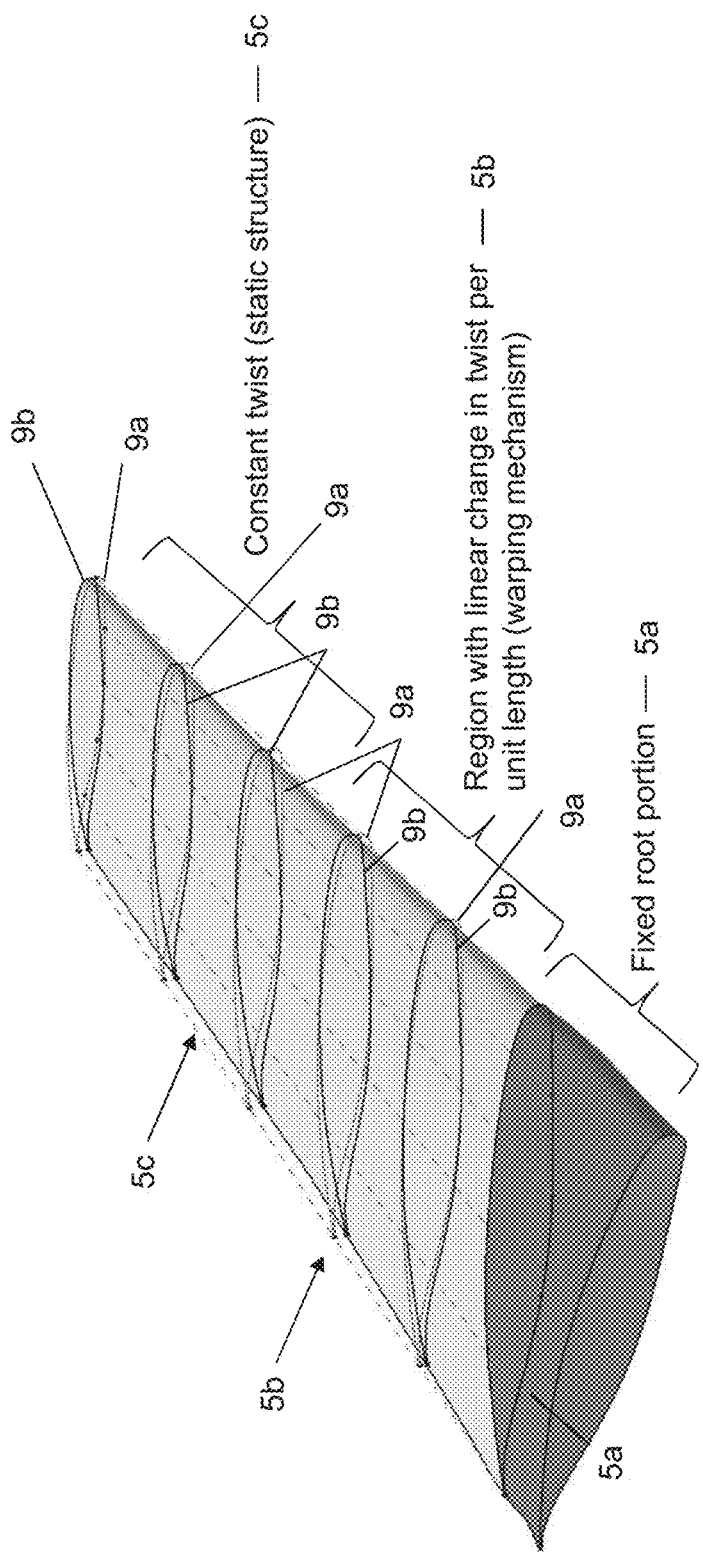
FIG. 2 shows a schematic view of the outer part of the wing of the aircraft in FIG. 1, showing the difference between the wing in an unwarped and a warped configuration.

Referring first to FIG. 2, this shows a schematic view of the outer 20% of one of the wings 5 of the aircraft 1, showing the difference between the wing in the unwarped and the warped configurations. This part of the wing 5 can be divided into three notional sections arranged in series: a fixed root portion 5a (which extends back to the fuselage—not visible in FIG. 2), a warping section 5b outboard of the fixed root, and a static twist section 5c outboard of the warping section 5b. Each section is a continuation of the adjacent section (i.e. continuations of the leading edge, trailing edge and upper and lower surfaces) and does not comprise any discrete control surface such as an aileron.

FIG. 2 illustrates the change in aerofoil orientation between the unwarped configuration (aerofoils labelled 9a and shown in light-coloured lines) and the warped configuration (aerofoils labelled 9b and shown in dark coloured lines). It can be seen from comparing the aerofoil sections at different positions along the wing, that within the warping section 5b, the aerofoil orientations 9b in the warped configuration diverge from those of the unwarped aerofoil orientation 9a. By warping the outer part of the wing 5 in this manner, the lift distribution on the wing is changed, and the flight of the aircraft 1 may be controlled without the use of ailerons or other discrete control surfaces.

The spar assembly that is used to effect the above-mentioned warping is shown in, and is now described with reference to, FIGS. 3-6.

Figure 3:
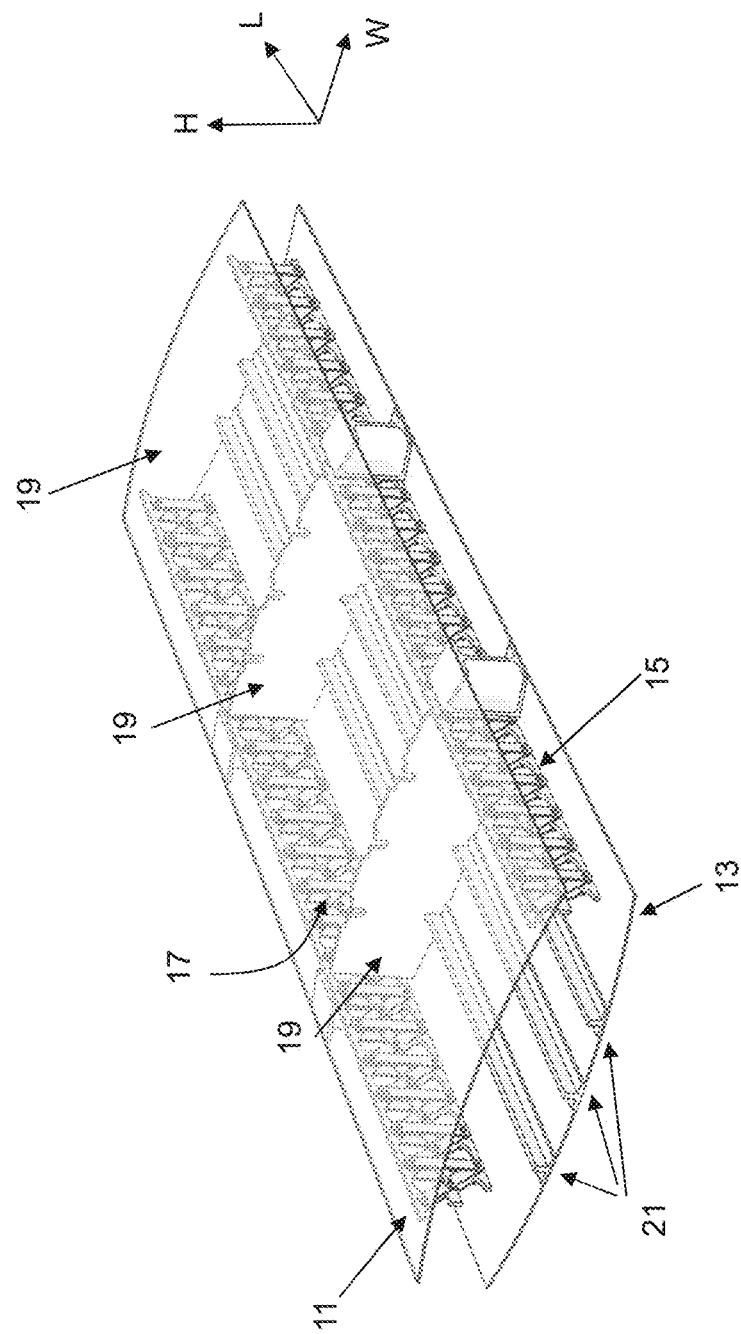
FIG. 3 shows a partial cut-way view of part of the outer wing in the aircraft of FIG. 1.

FIG. 3 is a partial cut-way view of the warping section 5b in the wing 5 of the aircraft 1. The warping section 5b comprises an upper cover 11 and a lower cover 13. The upper and lower covers are joined by leading and trailing edge panels, but for the sake of clarity, these are not shown in FIG. 3. A front spar assembly 15 extends along the front edge of the covers and a rear spar assembly 17 extends along the rear edge of the covers. Ribs 19 extend fore-aft between the front and rear spars, and stringers 21 extending along the underside of the upper and lower wing covers 11, 13. The front and rear spar assemblies 15, 17 are substantially identical, so for brevity only the front spar assembly 15 is described herein in detail. It will be appreciated, of course, that features of the front spar assembly 15 can equally be applied to the rear spar assembly 17.

References herein to directions/orientations of the spar assembly are, unless otherwise specified, made in a local reference frame in which the longitudinal direction L extends along the spar assembly, the height H extends through the depth of the wing between the lower and upper covers, and the width W extends from front to back of the spar assembly. It will be appreciated that this is akin to a typical Cartesian reference frame for an aircraft, but oriented to take into account the sweep and/or dihedral of the wing 5.

FIG. 3 only shows the linkages in the spar assemblies schematically. However, FIG. 4a shows a frontal view of part of the front spar-assembly 15 in more detail. The spar assembly 15 extends between the upper cover 11 and the lower cover 13. An upper attachment structure 23 is attached to the underside of upper cover. On its opposing side, the attachment structure 23 comprises a series of lugs 25 protruding into the interior of the wing 5. A similar, lower, attachment structure 27 is attached to the underside of lower cover. On its inward side, the lower attachment structure 27 also comprises a series of lugs 29 protruding into the interior of the wing 5.

The spar assembly 15 comprises a multiplicity of linkages 31 spaced along the length L of the spar assembly 15. Each linkage comprises a first link 33 connected, at one end, to an upper pivot 33a on a respective lug 25 of the upper attachment structure 23; and a second link 35 connected, at one end, to a lower pivot 35a on a respective lug 29 of the lower attachment structure 27. These two links 33, 35 are also pivotably connected together at their opposing ends at a third pivot 37. In the configuration shown in FIG. 4a, it will be appreciated that the first and second links are substantially in-line with one another—discussed in more detail below. The first and second links extend at approximately 45 degrees to the longitudinal direction.

Each linkage 31 also comprises a third link 39. The third link is oriented just below 90 degrees from the longitudinal axis and extends from the lower pivot 35a, to the upper pivot 33a of the adjacent linkage. The linkages 31 are thus arranged consecutively along the length of the spar assembly structure and share common pivot axes.

A straight drive bar 41 extends along the centerline of the linkages in a longitudinal direction along the spar assembly. The drive bar connects together all of the third (center) pivots joining the two links 33, 35 of each linkage. The drive bar 41 is also connected at one end to a linear actuator 43. In the unwarped configuration, shown in FIG. 4a, the actuator 43 is un-extended.

During flight, in the unwarped configuration, the spar assembly is primarily subjected to relative shear loadings between the upper and lower covers. For example, the upper cover tends to be urged inboard (to the left in FIG. 4a) and the lower cover tends to be urged outboard (to the right in FIG. 4b). Each of the links 33 and 35 tend to therefore be in tension (or would be in compression under the opposite shear loading).

The third link 39 acts to brace the spar assembly structure and prevents the upper and lower attachment structures collapsing in towards each other.

Since the two links are in line and their centerline runs through the third pivot, tensile/compressive forces acting on the third pivot balance and substantially no load is transferred along the drive bar and into the actuator. The spar assembly of the first embodiment of the disclosure herein therefore enables flight loads to be readily reacted into the wing structure rather than necessarily requiring an actuator that can withstand such flight loads.

Figure 4B:
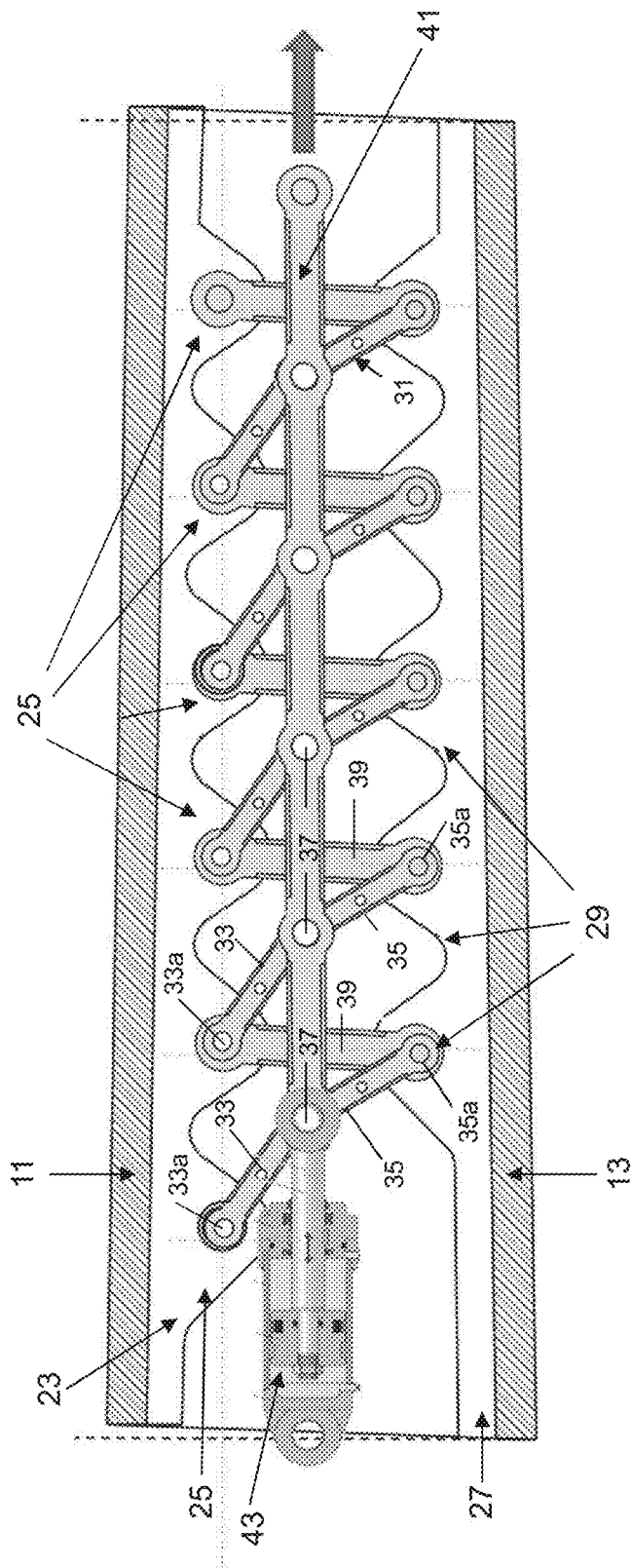
FIG. 4b shows the part of the front spar-assembly in FIG. 4a, when the assembly is in the warped configuration.

FIG. 4b shows the spar assembly of FIG. 4a but with the actuator 43 extended. When the actuator is extended, the third pivots 37 of the linkages 31 are all displaced in a longitudinal direction approximately 10 mm. This movement breaks the inline arrangement of the pair of links 33, 35 and they rotate relative to each other such that the included angle between the links is around 160 degrees. Since the links are of a fixed length, this movement necessarily moves the upper attachment structure longitudinally relative to the lower attachment structure, resulting in a reduction in the distance (longitudinal spacing) between the upper and lower pivots (i.e. an offset of the upper wing cover from the lower wing cover). For ease of comparison, FIG. 4b shows dashed vertical lines illustrating the location of the ends of the upper cover in the unwarped configuration in FIG. 4a.

In this configuration, the upper link 33 and the lower link 35 are in tension. The spar assembly of the first embodiment is beneficial in two ways in dealing with these loads: Firstly, since the spar assembly comprises a multiplicity of linkages, there is mechanical advantage (lever arm) between the pivot at which the actuator acts and the upper and lower attachment structures. This allows the actuator to be relatively low capacity (in comparison with there being no mechanical advantage and a need to act directly on the upper cover).

Figure 5:
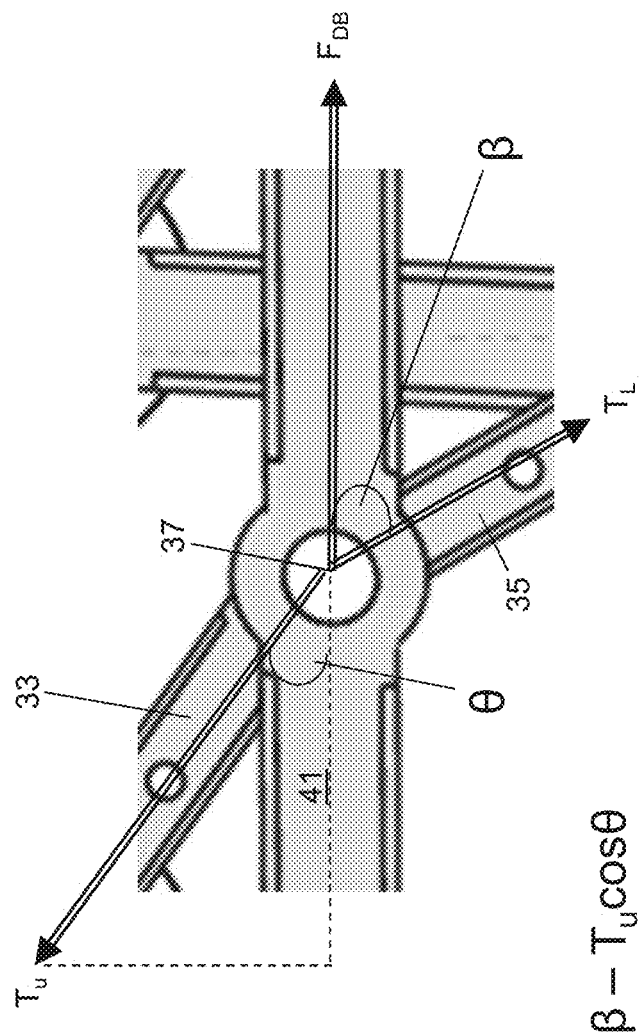
FIG. 5 shows a close up view of a third pivot in one of the linkages in FIG. 4b, and the forces acting on the pivot.

Secondly, the upper and lower links remain relatively close to their inline orientation. The majority of the flight loads transferred along the links are therefore still transferred directly into the wing structure. The component in a direction along the length of the drive bar (i.e. into the actuator) is relatively small. FIG. 5 shows a force diagram indicating the forces acting along the drive bar when the wing is experiencing flight loads in the warped configuration. In the example in FIG. 5, the flight loads are urging the upper cover inboard (to the left in FIG. 4b) and the lower cover is being urged outboard (to the right in FIG. 4b). The upper link and lower links 33, 35 are therefore under tension. In this example, the angles of the upper and lower links 33, 35 from the longitudinal direction are relatively similar, so the net force $F_{DB}$ acting in a direction along the drive bar is relatively low because angles $\beta$ and $\theta$ are of relatively similar magnitude. This enables use of a relatively low capacity actuator.

To warp the wing, the actuators 43 on the front and rear spar assemblies 15, 17 are actuated to move the links in the manner shown in FIG. 4b. The relative longitudinal movement between the upper and lower covers 11, 13 along the front and back of the wing can be tailored to create a twisting action about a twist axis of the wing, thereby warping the upper and lower covers to which the spar assemblies are attached.

As will be understood from FIGS. 4a and 4b and the explanation above, the spar assembly in the first embodiment is stiff when it is holding the wing in the unwarped configuration (FIG. 4a). The box beam (formed between the ribs, spar assemblies and covers) is a closed section and therefore of very high torsional stiffness. While the spar assembly is able to be actuated to warp the wing (see above), the spar assembly returns to a stiff structure once actuation has been completed and the box beam therefore retains it high torsional stiffness for flight loading.

Figure 6:
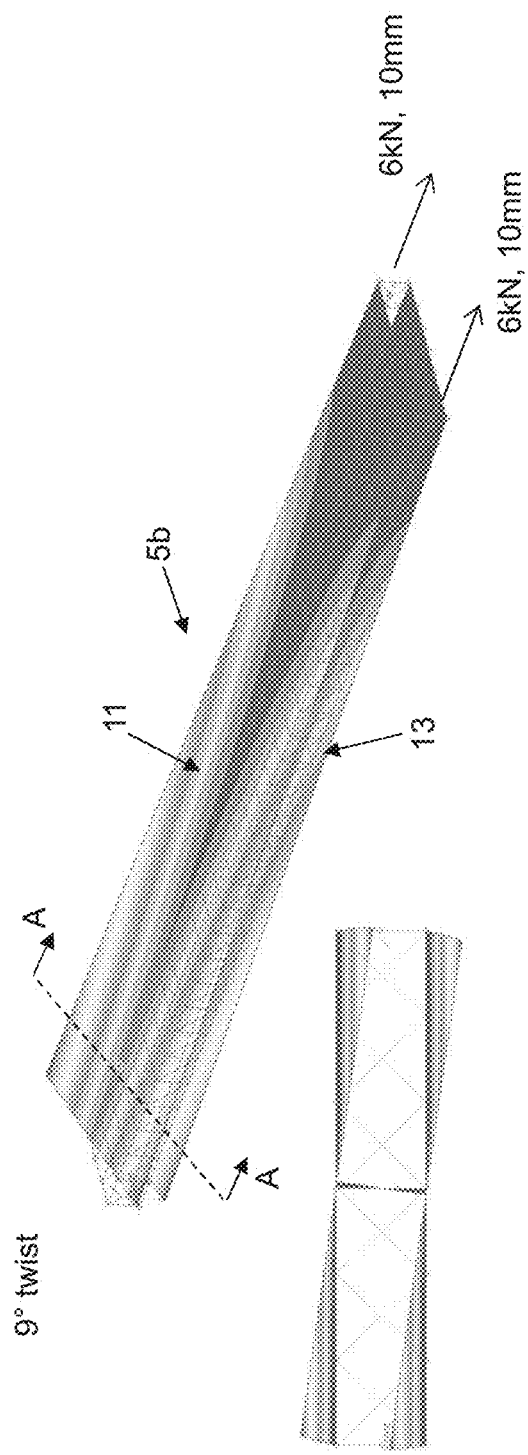
FIG. 6 is a graphic showing the warping of part of the wing in the warped configuration.

FIG. 6 is a schematic showing the twist of the warping section 5b of the wing 5. The darker shading represents low displacement from the unwarped configuration, and the lighter shading represents higher displacement from the unwarped configuration. A twist of 9 degrees was obtained using an actuation force on the front and rear spar assemblies of 6 kN (when actuated without flight loads). An end-on view through A-A is also shown to illustrate the twist of the wing about a neutral twist axis.

Referring back to FIG. 2, the wing comprises a constant twist section 5c attached to the end of the warping section 5b in which the spar assemblies are present. The static section does not itself twist, but instead extends from the end of the warping action at the respective twist angle of that end. Likewise at the inner end, the warping section is attached to the fixed root portion, which effectively acts as a zero twist datum for the warping section. The spar assembly of the first embodiment of the disclosure herein is therefore only used along a relatively short section of the wing. It will be appreciated that in other embodiments, a spar assembly may be used along a longer or shorter length of the wing as appropriate.

While the disclosure herein has been described and illustrated with reference to particular embodiments, it will be appreciated by those of ordinary skill in the art that the disclosure herein lends itself to many different variations not specifically illustrated herein. For example, the spar assembly may have a second actuator at the other end of the drive bar. The second actuator may be a back-up actuator in the event of failure of the primary actuator. The spar assembly may be a shear resisting assembly in another part of the aircraft, such as a rudder or elevator. In another embodiment, not shown, the first and second links are angled relative to one another in the unwarped configuration and move towards the in-line arrangement to warp the wing.

Where in the foregoing description, integers or elements are mentioned which have known, obvious or foreseeable equivalents, then such equivalents are herein incorporated as if individually set forth. Reference should be made to the claims for determining the true scope of the disclosure herein, which should be construed so as to encompass any such equivalents. It will also be appreciated by the reader that integers or features of the disclosure herein that are described as preferable, advantageous, convenient or the like are optional and do not limit the scope of the independent claims. Moreover, it is to be understood that such optional integers or features, while of possible benefit in some embodiments of the disclosure herein, may not be desirable, and may therefore be absent, in other embodiments.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft wing comprising:
   an upper cover;
   lower cover;
   a spar assembly extending between the upper cover and the lower cover, wherein the spar assembly comprises:
      an upper attachment structure connected to the upper cover,
      a lower attachment structure connected to the lower cover;
      a multiplicity of linkages spaced along a length of the spar assembly, each of the linkages comprising a first link, which has a first end that is pivotably connected to and extends from an upper pivot on the upper attachment structure, and a second link, which has a first end that is pivotably connected to and extends from a lower pivot on the lower attachment structure, wherein the first link and the second link are pivotably connected, at respective second ends thereof, at a third pivot, thereby joining the upper and lower attachment structures together, and
      a drive bar connected to the third pivot of each of the multiplicity of linkages;
      wherein each linkage is adjustable, by adjusting a position of the third pivot, such that the first and second links are pivoted about the third pivot and a distance between the upper and lower pivots is altered, thereby enabling the wing to be warped, and
      wherein, by adjusting the position of the third pivot, relative positions of the first and second links about the third pivot are respectively adjustable over a range of positions, wherein the range of positions includes a position in which the first, second, and third pivots are positioned in a straight line; and
   an actuator arranged to move the drive bar, such that the actuator can simultaneously adjust the position of the multiplicity of third pivots.

2. The wing according to claim 1, wherein the upper pivot and the lower pivot to which a same linkage of the multiplicity of linkages is connected are spaced apart from each other in a span direction of the wing.

3. The wing according to claim 1, wherein each pair of first and second links is associated with a third link, the third link extending from the lower pivot to a fourth pivot, the fourth pivot being on the upper attachment structure.

4. The wing according to claim 3, wherein the fourth pivot is coincident with an upper pivot of an adjacent linkage.

5. The wing according to claim 1, wherein the spar assembly is a first spar assembly located along a relatively forward or rearward part of the upper and lower covers, the wing comprising a second spar assembly, located along another of the forward or rearward part of the covers.

6. A spar assembly for use as the spar assembly according to claim 1.

7. An aircraft comprising the aircraft wing according to claim 1.

8. A method of warping a wing on an aircraft, the method comprising:
   connecting a spar assembly between upper and lower covers of the wing;

connecting an upper attachment structure of the spar assembly to the upper cover of the wing, wherein the upper attachment structure comprises a plurality of upper pivots;

connecting a lower attachment structure of the spar assembly to the lower cover of the wing, wherein the lower attachment structure comprises a plurality of lower pivots;

providing a multiplicity of linkages spaced apart in a span direction of the wing;

connecting, in a pivotable manner, a first end of a first link of each linkage to extend from one of the upper pivots on the upper attachment structure;

connecting, in a pivotable manner, a first end of a second link of each linkage to extend from one of the lower pivot points on the lower attachment structure;

connecting, in a pivotable manner and for each linkage, a second end of the first link to a second end of the second link at a third pivot to join the upper and lower attachment structures together;

connecting a drive bar to the third pivot of each of the multiplicity of linkages;

moving, using an actuator, the drive bar along the length of the spar assembly to simultaneously adjust the position of the multiplicity of third pivots;

actuating, by adjusting a position of the third pivot so that the first and second links are pivoted about the third pivot, the multiplicity of linkages from a first configuration, in which the upper and lower pivots are at a first spacing from each other, to a second configuration, in which the upper and lower pivots are at a second spacing from each other, wherein the first spacing is different from the second spacing, such that the wing is warped as the linkages are actuated between the first and second configurations;

wherein, by adjusting the position of the third pivot, relative positions of the first and second links about the third pivot are respectively adjustable over a range of positions, wherein the range of positions includes a position in which the first, second, and third pivots are positioned in a straight line.

9. The method according to claim 8, wherein the upper pivot and the lower pivot to which a same linkage of the multiplicity of linkages is connected are spaced apart from each other in the span direction of the wing.

10. A spar assembly for extending between an upper cover and a lower cover on an aircraft wing, the spar assembly comprising:

an upper attachment structure for connecting to the upper cover;

a lower attachment structure for connecting to the lower cover;

a multiplicity of linkages spaced consecutively along a length of the spar assembly, each of the linkages comprising a first link, which has a first end that is pivotably connected to and extends from an upper pivot on the upper attachment structure, and a second link, which has a first end that is pivotably connected to and extends from a lower pivot on the lower attachment structure, wherein the first link and the second link are pivotably connected, at respective second ends thereof, at a third pivot, thereby joining the upper and lower attachment structures together;

a drive bar connected to the third pivot of each of the multiplicity of linkages; and an actuator arranged to move the drive bar along the length of the spar assembly, such that the actuator can simultaneously adjust the position of the multiplicity of third pivots;

wherein each linkage is adjustable, by adjusting a position of the third pivot, such that the first and second links are pivoted about the third pivot and a distance between the upper and lower pivots is altered, thereby enabling the wing to be warped;

wherein, by adjusting the position of the third pivot, positions of the first and second links about the third pivot are respectively adjustable over a range of positions, wherein the range of positions includes a position in which the first, second, and third pivots are positioned in a straight line.

11. An aerodynamic structure comprising:

a first cover;

a second cover;

a shear-resisting assembly extending between the first cover and the second cover, wherein the shear-resisting assembly comprises:

a first attachment structure connected to the first cover;

a second attachment structure connected to the second cover; and a multiplicity of linkages spaced along a length of the shear-resisting assembly, each of the linkages comprising a first link, which has a first end that is pivotably connected to and extends from a first pivot on the first attachment structure, and a second link, which has a first end that is pivotably connected to and extends from a second pivot on the second attachment structure, wherein the first link and the second link are pivotably connected, at respective second ends thereof, at a third pivot, thereby joining the first and second attachment structures together, wherein each linkage is adjustable, by adjusting a position of the third pivot, such that the first and second links are pivoted about the third pivot and a distance between the first and second pivots is altered, thereby enabling the aerodynamic structure to be warped, and wherein, by adjusting the position of the third pivot, relative positions of the first and second links about the third pivot are respectively adjustable over a range of positions, wherein the range of positions includes a position in which the first, second, and third pivots are positioned in a straight line a drive bar connected to the third pivot of each of the multiplicity of linkages; and an actuator arranged to move the drive bar along the length of the shear-resisting assembly, such that the actuator can simultaneously adjust the position of the multiplicity of third pivots.

12. The aerodynamic structure of claim 11, wherein, when the actuator moves the drive bar along the length of the shear-resisting structure, the first and second links of each linkage are rotated relative to each other about the third pivot, thereby altering a longitudinal offset between the first and second attachment structures.

13. The aerodynamic structure of claim 11, wherein the first pivot and the second pivot, to which a same linkage of the multiplicity of linkages is connected, are spaced apart from each other in a span direction of the wing.

14. The spar assembly of claim 10, wherein, when the actuator moves the drive bar along the length of the spar structure, the first and second links of each linkage are rotated relative to each other about the third pivot, thereby altering a longitudinal offset between the upper and lower attachment structures.

15. The spar assembly of claim 10, wherein the upper pivot and the lower pivot to which a same linkage of the multiplicity of linkages is connected are spaced apart from each other in a span direction of the wing.

* * * * *